United States Patent
Mleczko et al.

(10) Patent No.: US 10,899,186 B2
(45) Date of Patent: Jan. 26, 2021

(54) CAM ADJUSTMENT MECHANISM FOR VEHICLE SUSPENSION CONTROL ARM MOUNT

(71) Applicant: Mahindra N.A. Tech Center, Auburn Hills, MI (US)

(72) Inventors: David J. Mleczko, Rochester Hills, MI (US); Matthew T. Brown, South Lyon, MI (US)

(73) Assignee: Mahindra N.A. Tech Center, Auburn Hills, MI (US)

( * ) Notice: Subject to any disclaimer, the term of this patent is extended or adjusted under 35 U.S.C. 154(b) by 46 days.

(21) Appl. No.: 16/273,611

(22) Filed: Feb. 12, 2019

(65) Prior Publication Data
US 2020/0254842 A1  Aug. 13, 2020

(51) Int. Cl.
*B60G 3/00* (2006.01)
*B60G 7/00* (2006.01)
*B62D 17/00* (2006.01)

(52) U.S. Cl.
CPC ............. *B60G 7/008* (2013.01); *B62D 17/00* (2013.01); *B60G 2200/46* (2013.01);
(Continued)

(58) Field of Classification Search
CPC .. B60G 7/02; B60G 2204/42; B60G 2200/46; B60G 2200/4622; B62D 17/00;
(Continued)

(56) References Cited

U.S. PATENT DOCUMENTS 4,267,896 A * 5/1981 Hendriksen ............ B60G 9/003
267/66
4,616,845 A * 10/1986 Pettibone ............... B60G 3/205
280/86.75

(Continued)

FOREIGN PATENT DOCUMENTS

EP        1932692 A1   6/2008
KR     101710372 B1   3/2017

OTHER PUBLICATIONS

International Search Report and Written Opinion regarding International Application No. PCT/US2020/014723 dated May 26, 2020.

*Primary Examiner* — Toan C To
(74) *Attorney, Agent, or Firm* — Harness, Dickey & Pierce, P.L.C.

(57) ABSTRACT

A vehicle suspension assembly including a suspension control arm pivotally coupled to a vehicle frame member by a bushing assembly. The bushing assembly includes a bushing bracket, a bushing, and a cam adjustment mechanism that couples the bushing bracket to a connection interface of the vehicle frame member. The cam adjustment mechanism includes a cam plate rotatably retained on a first fastener such that the cam plate is rotatable relative to the bushing bracket independent of rotation of the first fastener. The cam plate is rotatable relative to the first fastener and the bushing bracket about an axis of rotation that is spaced from a centerline of the bushing at a nonparallel orientation. Rotation of the cam plate relative to the first fastener adjusts the position of the bushing bracket and therefore the bushing relative to the vehicle frame member to provide alignment adjustment.

18 Claims, 8 Drawing Sheets

(52) U.S. Cl.
CPC ...... *B60G 2204/41* (2013.01); *B60G 2204/42* (2013.01); *B60G 2204/43* (2013.01); *B60G 2204/44* (2013.01); *B60G 2204/61* (2013.01)

(58) Field of Classification Search
CPC ...... F16B 35/041; F16B 35/048; F16B 19/02; F16B 43/00; F16B 5/0225
USPC ..... 280/124.128, 124.132, 124.134, 124.135
See application file for complete search history.

(56) References Cited

U.S. PATENT DOCUMENTS

| | | | | |
|---|---|---|---|---|
| 4,736,964 | A * | 4/1988 | Specktor | B60G 7/02 280/86.75 |
| 5,052,711 | A * | 10/1991 | Pirkey | B62D 17/00 280/86.753 |
| 5,301,977 | A * | 4/1994 | Schlosser | B62D 17/00 280/86.75 |
| 5,398,411 | A * | 3/1995 | Kusaka | B23P 13/04 280/124.134 |
| 7,278,648 | B2 * | 10/2007 | Bobbitt, III | B60G 7/003 280/124.123 |
| 8,356,839 | B1 * | 1/2013 | Vey | B60G 3/20 280/124.109 |
| 9,233,589 | B1 * | 1/2016 | Miller | B60G 7/02 |
| 2006/0181043 | A1 | 8/2006 | Zebolsky | |
| 2009/0224503 | A1 | 9/2009 | Richardson | |

* cited by examiner

CAM ADJUSTMENT MECHANISM FOR VEHICLE SUSPENSION CONTROL ARM MOUNT

FIELD

The present disclosure relates generally to suspension systems such as suspension systems for automotive vehicles. More particularly, the present disclosure relates to a cam adjustment mechanism for vehicle suspension control arm mounts.

BACKGROUND

This section provides background information related to the present disclosure which is not necessarily prior art.

Many vehicle suspension systems utilize control arms that are pivotally coupled to a vehicle frame member by a bushing assembly. For instance, both solid axle and independent vehicle suspension systems make use of one or more control arms at each wheel of the vehicle. Most independent vehicle suspension systems include a lower control arm at each wheel that is pivotally connected to the vehicle frame by two bushing assemblies. Often, one of these bushing assemblies is made larger than the other for improved ride and comfort. The smaller bushing assembly often includes a cam bolt that extends through the center of the bushing assembly to attach the bushing assembly to a frame bracket that is welded or separately bolted to the vehicle frame. The cam bolt includes a shank, bolt head, and cam lobe that is fixed to the bolt head and shank. The cam lobe therefore rotates with the cam bolt when a tool, such as a wrench, is used to turn the bolt head. The cam lobe reacts (i.e., presses) against a cam guide, which is typically welded to the frame bracket, to adjust the alignment of the lower control arm. This provides toe-in adjustment for the wheels of the vehicle. Due to packaging constraints and a lack of access, a cam bolt cannot be used to mount the larger bushing assembly to the frame in many vehicle suspension designs even though alignment adjustment for the larger bushing assembly would be desirable. Accordingly, there remains a need for an improved bushing assembly that can provide adjustability when packaging constraints and access prevent the use of a typical cam bolt.

SUMMARY

This section provides a general summary of the disclosure, and is not a comprehensive disclosure of its full scope or all of its features.

In accordance with an aspect of the present disclosure, an improved vehicle suspension assembly is provided. The vehicle suspension assembly includes a vehicle frame member and a suspension control arm that is pivotally coupled to the vehicle frame member by a bushing assembly. The bushing assembly includes a bushing bracket and a bushing that is retained by the bushing bracket. A cam adjustment mechanism couples the bushing bracket to a connection interface of the vehicle frame member. The cam adjustment mechanism includes a cam plate that is rotatably retained on a first fastener, meaning that the cam plate is rotatable relative to the bushing bracket independent of rotation of the first fastener. The bushing has a bushing centerline that defines a pivot axis of the suspension control arm. The cam plate is rotatable relative to the first fastener and the bushing bracket about an axis of rotation that is spaced from the bushing centerline at a nonparallel orientation. In other words, the axis of rotation of the cam plate is offset from and perpendicular or oblique to the bushing centerline. In accordance with this arrangement, a tool can be used to rotate the cam plate relative to the first fastener, which adjusts the position of the bushing bracket and therefore the bushing relative to the vehicle frame member to provide alignment adjustment. Because the axis of rotation is spaced from the bushing centerline at a perpendicular or oblique orientation, packaging constraints do not limit access to the cam plate, which can be oriented along the bottom of the vehicle facing downward towards the ground. The cam plate is therefore easily accessible from underneath the vehicle.

Further areas of applicability and advantages will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Referring to the Figures, wherein like numerals indicate corresponding parts throughout the several views, a vehicle suspension assembly 20 is disclosed.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
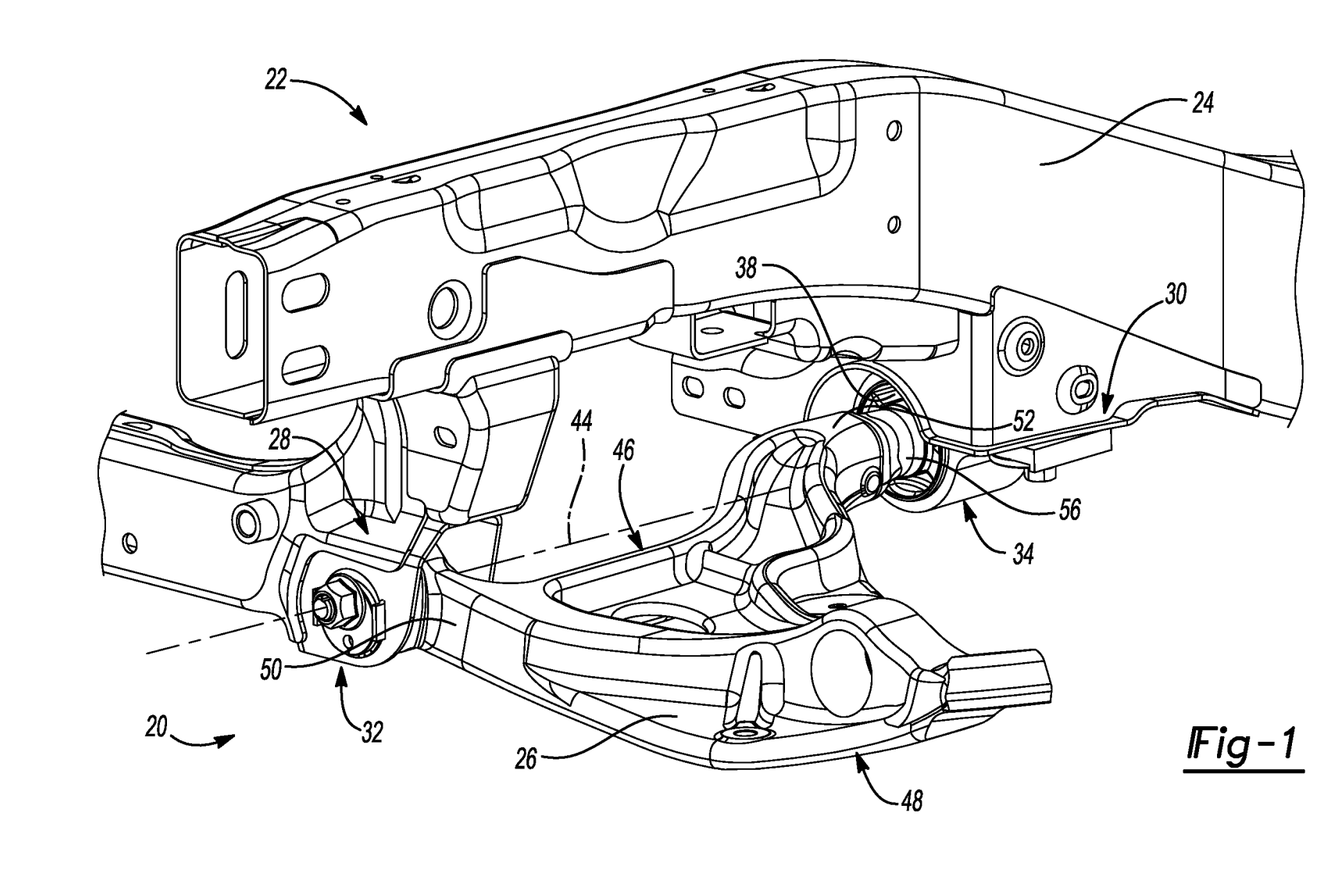
FIG. 1 is a side perspective view of a vehicle suspension assembly constructed in accordance with the teachings of the present disclosure, which includes first and second bushing assemblies.
Figure 2:
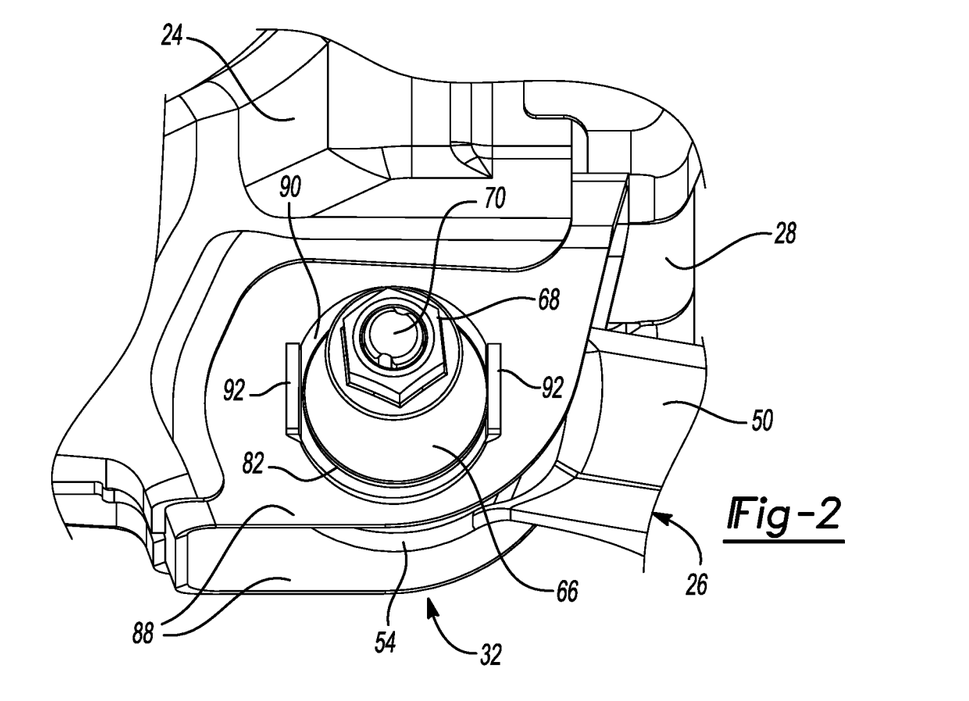
FIG. 2 is a rear perspective view of the first bushing assembly of the vehicle suspension assembly shown in FIG. 1.
Figure 3:
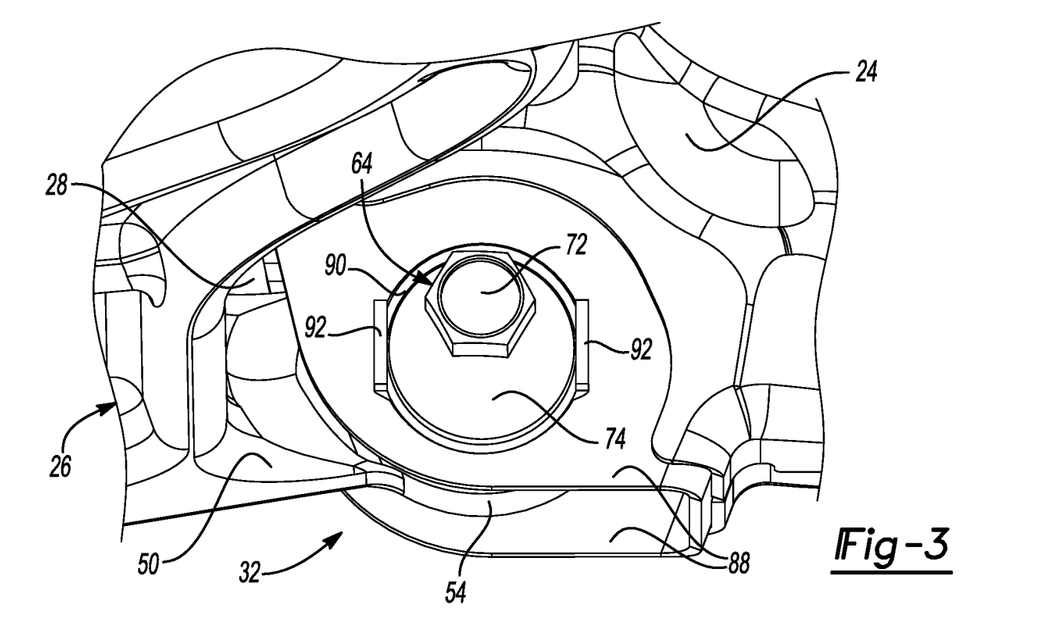
FIG. 3 is a front perspective view of the first bushing assembly of the vehicle suspension assembly shown in FIG. 1.
Figure 4:
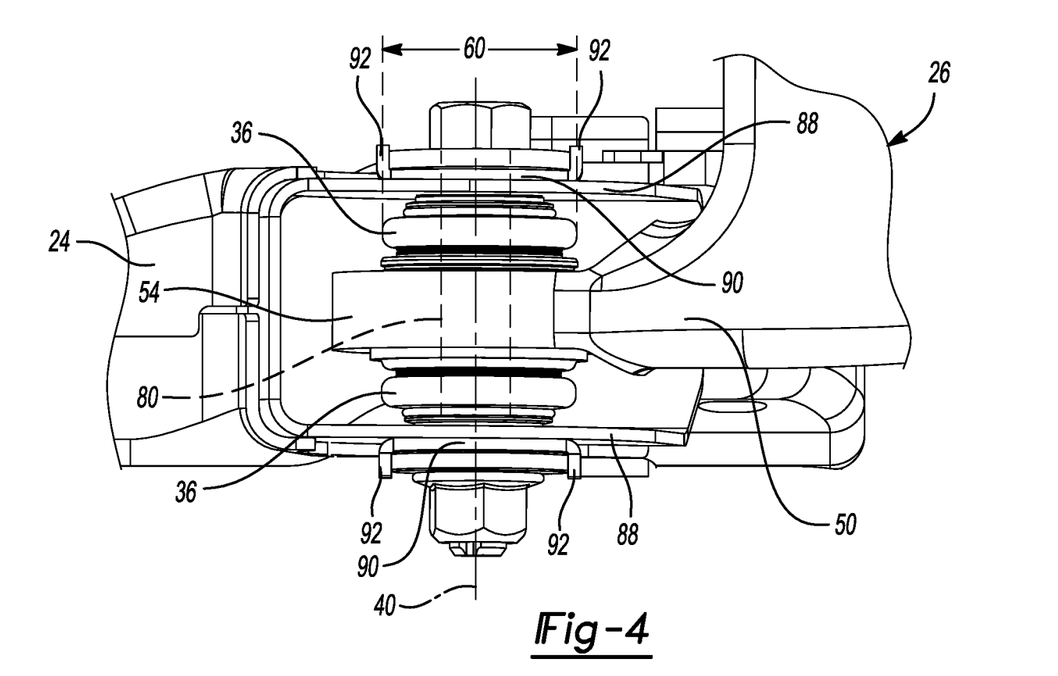
FIG. 4 is a bottom plan view of the first bushing assembly of the vehicle suspension assembly shown in FIG. 1.
Figure 5:
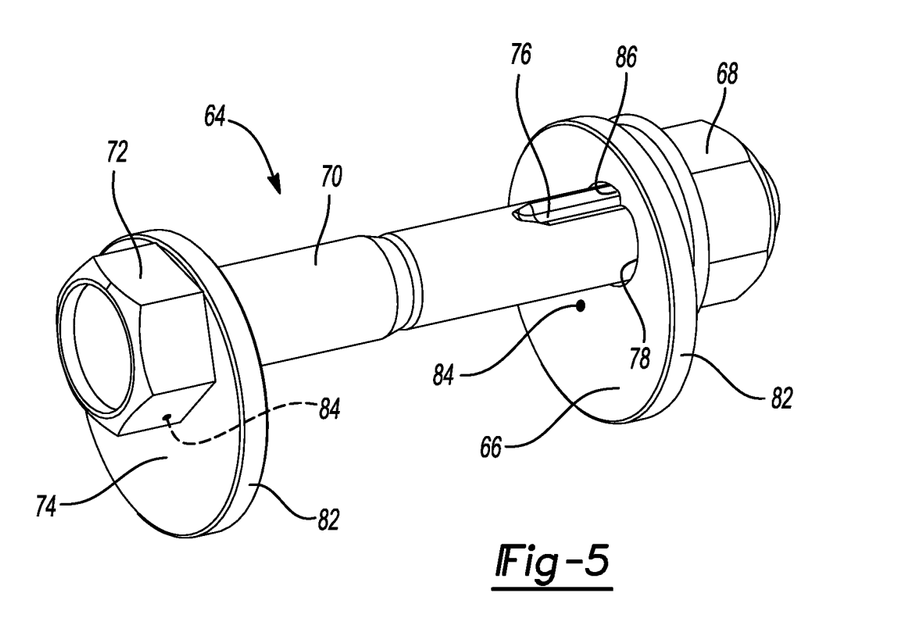
FIG. 5 is a side perspective view of a cam bolt and nut sub-assembly of the first bushing assembly shown in FIG. 4.
Figure 6:
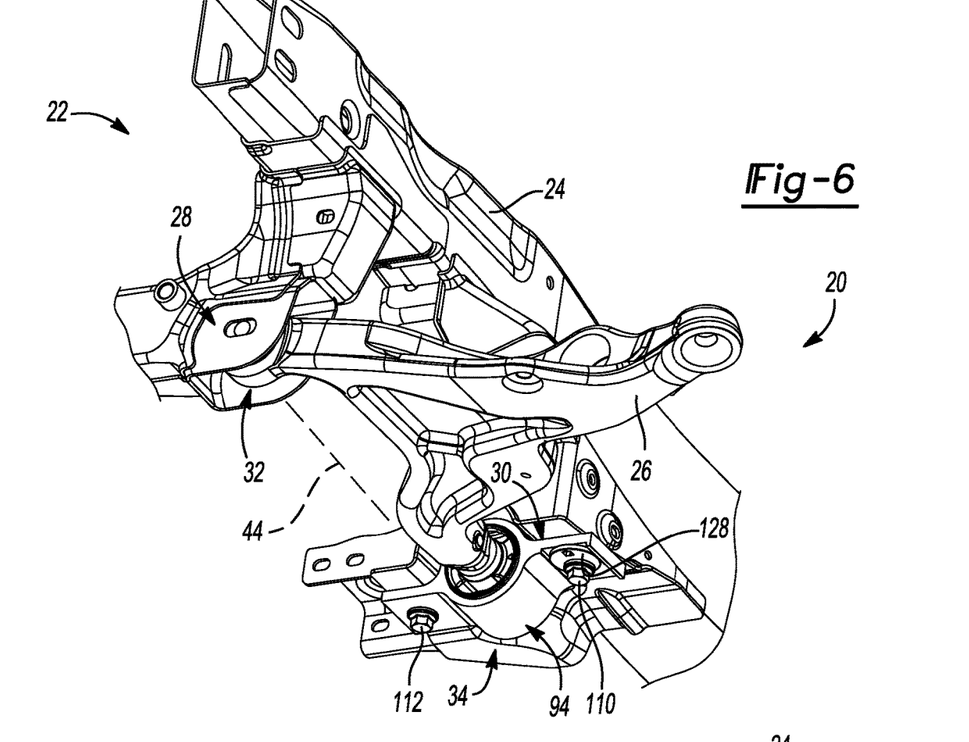
FIG. 6 is a bottom perspective view of the vehicle suspension assembly shown in FIG. 1.
Figure 7:
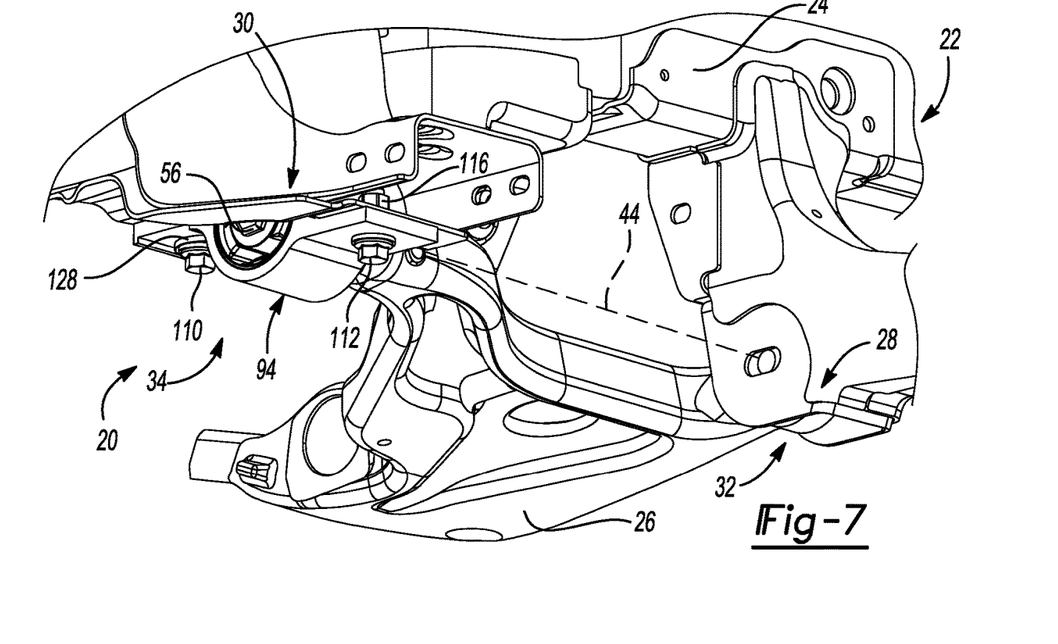
FIG. 7 is another side perspective view of the vehicle suspension assembly shown in FIG. 1.

With reference to FIG. 1, a vehicle frame assembly 22 is illustrated. The vehicle frame assembly 22 includes a vehicle frame member 24. In the illustrated embodiment, in which a body-on-frame vehicle arrangement is depicted, the vehicle frame member 24 has the form of a frame rail. However, it should be appreciated that other configurations are possible where the vehicle frame member 24 is any structural component of the vehicle, which may include various vehicle body or chassis components. A suspension control arm 26 is pivotally coupled to first and second connection interfaces 28, 30 on the vehicle frame member 24 by first and second bushing assemblies 32, 34. The first bushing assembly 32 includes a first bushing 36 and the second bushing assembly 34 includes a second bushing 38, both of which are made of an elastomeric material such as rubber. The first bushing 36 has a first bushing centerline 40 and the second bushing 38 has a second bushing centerline 42. Although other configurations are possible, in the illustrated embodiment, the first and second bushing centerlines 40, 42 are parallel with one another and cooperate to define a pivot axis 44 of the suspension control arm 26. The suspension control arm 26 pivots up and down relative to the vehicle frame member 24 about the pivot axis 44. Although the suspension control arm 26 can be made of a variety of different materials, the suspension control arm 26 may be made of a metal such as aluminum or steel.

Figure 8:
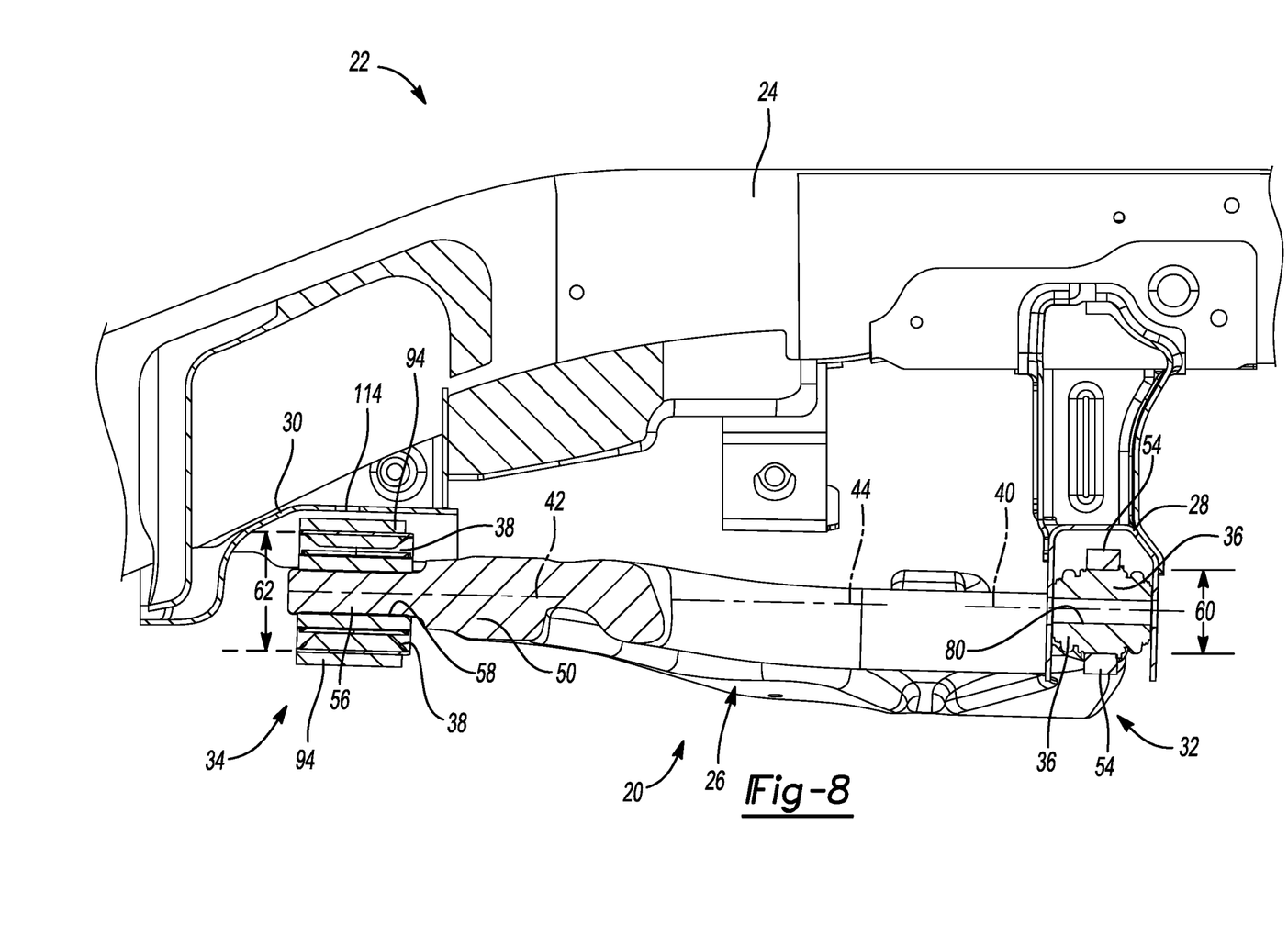
FIG. 8 is a side section view of the vehicle suspension assembly shown in FIG. 1.
Figures 9, 10:
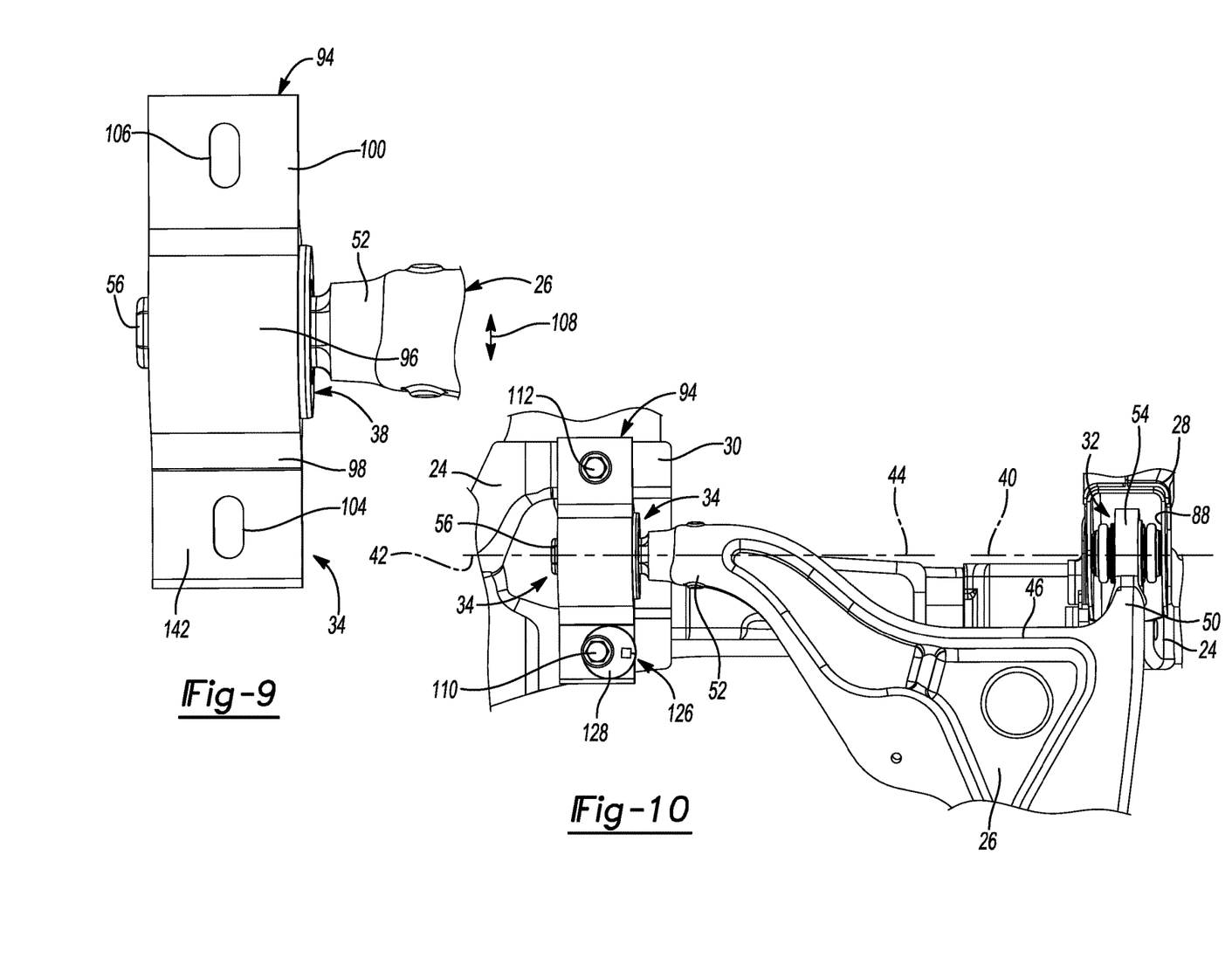
FIG. 9 is a bottom plan view of the second bushing assembly of the vehicle suspension assembly shown in FIG. 1.
FIG. 10 is a bottom plan view of the vehicle suspension assembly shown in FIG. 1.
Figure 11:
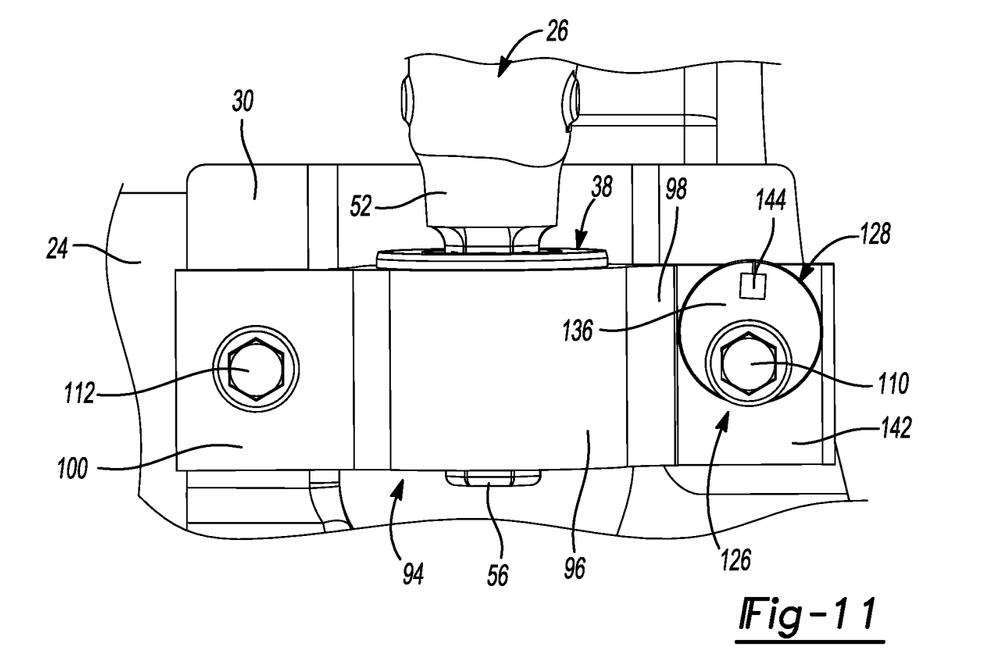
FIG. 11 is another bottom plan view of the second bushing assembly of the vehicle suspension assembly shown in FIG. 1, where a cam adjustment mechanism that is constructed in accordance with the present disclosure is illustrated.
Figure 12:
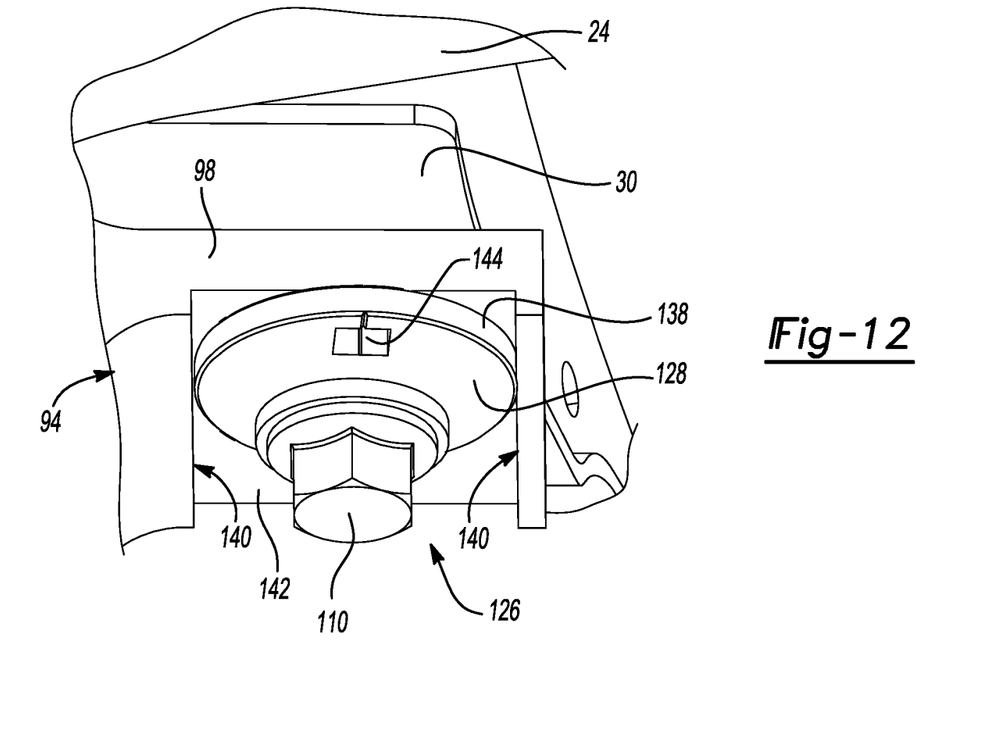
FIG. 12 is a bottom perspective view of the cam adjustment mechanism shown in FIG. 11.
Figure 13:
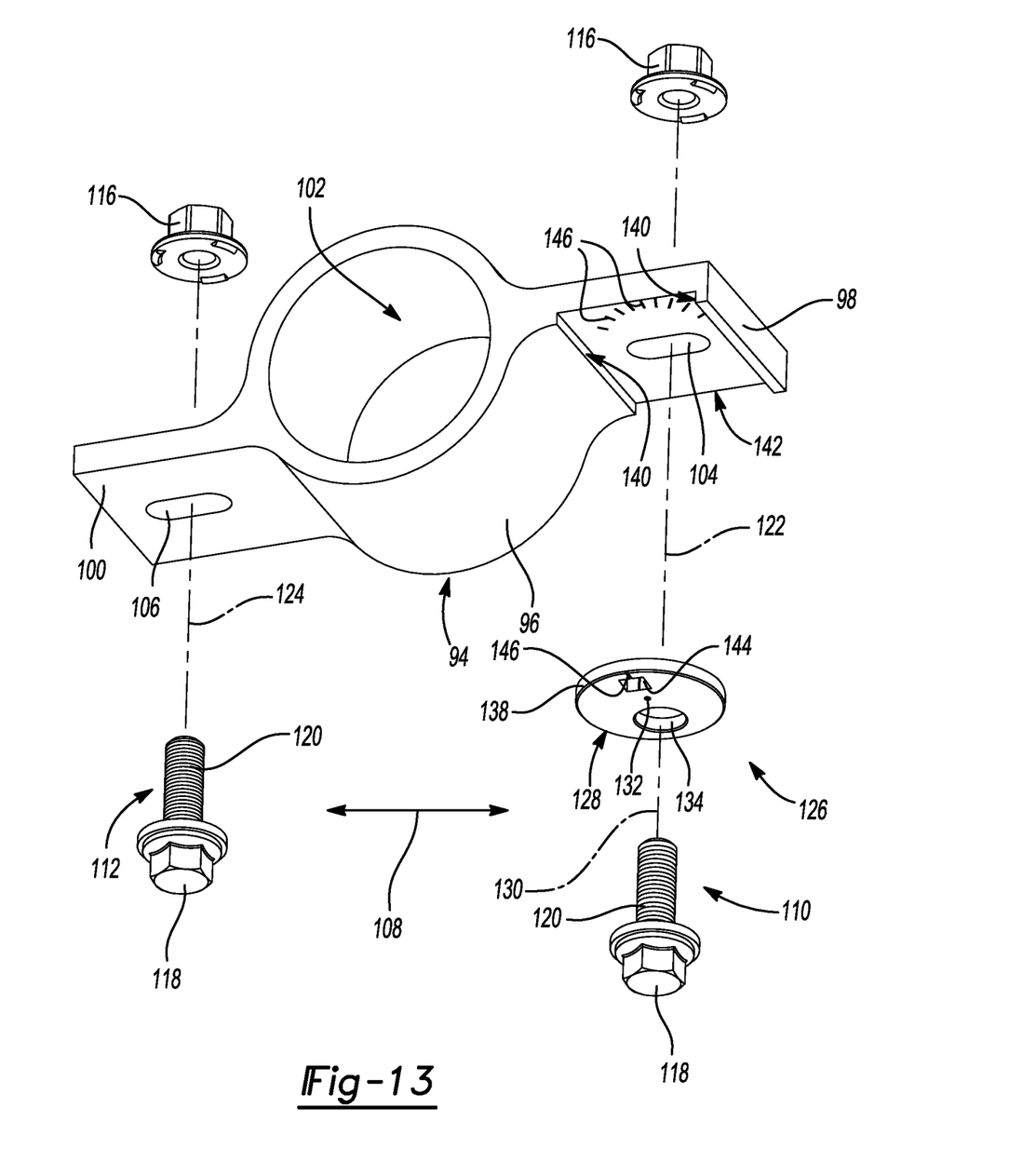
FIG. 13 is an exploded perspective view of the cam adjustment mechanism shown in FIG. 11.

The suspension control arm 26 has an inboard portion 46 and an outboard portion 48. The inboard portion 46 of the suspension control arm 26 includes a forward end 50 that faces a front end of the vehicle (not shown) and a rearward end 52 that faces the rear end of the vehicle (not shown). The forward end 50 of the inboard portion 46 of the suspension control arm 26 includes a bushing loop 54 that extends annularly about and supports the first bushing 36. As shown in FIGS. 1 and 8, the rearward end 52 of the inboard portion 46 of the suspension control arm 26 includes a post 56 that is received in a central bore 58 in the second bushing 38. As a result, the second bushing 38 is positioned annularly about the post 56 of the suspension control arm 26. The first bushing 36 has a first diameter 60 and the second bushing 38 has a second diameter 62 that is larger than the first diameter 60 of the first bushing 36. As a result, the second bushing 38 provides more cushioning for improved ride quality and comfort.

The outboard portion 48 of the suspension control arm 26 is configured to support a wheel of the vehicle (not shown). The suspension control arm 26 is adapted for attachment to one end of a spring/damper system (not shown). The other end of the spring/damper system is connected to the vehicle frame assembly 22 or body of the vehicle (not shown). It should therefore be appreciated that the suspension control arm 26 forms part of the unsprung mass of the vehicle. The suspension control arm 26 pivots up and down about the pivot axis 44 during suspension movements, which are controlled by the spring/damper system.

In the example shown in the drawings, the vehicle suspension assembly 20 is part of an independent suspension system where the suspension control arm 26 is a lower control arm. Optionally, the suspension system may additionally include an upper control arm (not shown). However, it should be appreciated that the present disclosure is not limited to fully independent suspension systems. It should be appreciated that the teachings of the present disclosure are applicable to a wide variety of different vehicle suspension systems, including without limitation, to solid axle suspension systems that utilize control arms to connect the solid axle to the vehicle frame or vehicle body.

With additional reference to FIGS. 2-5, the first bushing assembly 32 includes a cam bolt 64, a cam washer 66, and a nut 68. The cam bolt 64 includes a shank 70, a bolt head 72, and a cam lobe 74. The cam lobe 74 is fixed to and integral with the bolt head 72 and the shank 70 such that rotation of the cam bolt 64 results in an in-kind rotation of the cam lobe 74. The shank 70 of the cam bolt 64 has threads and the nut 68 is threaded onto the shank 70. The shank 70 of the cam bolt 64 also includes an indexing groove 76 that extends axially along a cylindrical surface of the shank 70. The cam washer 66 includes an offset hole 78. When the first bushing assembly 32 is assembled, the shank 70 of the cam bolt 64 extends through a center bore 80 in the first bushing assembly 32 and the offset hole 78 in the cam washer 66. Both the cam lobe 74 and the cam washer 66 have flat disc-like shapes, circular outer edges 82, and centerpoints 84 that are offset from the shank 70 of the cam bolt 64. As a result, the cam lobe 74 and the cam washer 66 are eccentric relative to the shank 70. The cam washer 66 includes a key projection 86 that extends into the offset hole 78. This key projection 86 is received in the indexing groove 76 of the shank 70 such that the eccentric orientation of the cam washer 66 matches that of the cam lobe 74. The key projection 86 also prevents the cam washer 66 from rotating on the shank 70 of the cam bolt 64. In other words, the cam washer 66 rotates with the cam bolt 64 and cannot rotate independently of the cam bolt 64.

The vehicle frame member 24 includes a yoke 88 that receives the bushing loop 54 of the suspension control arm 26 and the first bushing assembly 32. Cam guides 90 are welded to the yoke 88. The shank 70 of the first bushing assembly 32 extends through the yoke 88 to attach the first bushing assembly 32 to the first connection interface 28 of the vehicle frame member 24. The cam guides 90 include tabs 92 that are arranged in contact with the circular outer edges 82 of the cam lobe 74 and the cam washer 66. To adjust the position of the first bushing assembly 32 and therefore the toe-in alignment of the suspension control arm 26, the nut 68 is loosened on the shank 70 of the cam bolt 64 and then the bolt head 72 is rotated with a tool (not shown), such as a wrench, to turn the cam bolt 64 and the cam washer 66 relative to the yoke on the vehicle frame member 24. Rotation of the cam bolt 64 causes the circular outer edges 82 of the cam lobe 74 and the cam washer 66 to react (i.e., press) against the tabs 92 of the cam guides 90, which shifts the first bushing centerline 40 relative to the vehicle frame member 24. The first bushing assembly 32 represents the state of the art for cam adjustable suspension control arm 26 mounts. One limitation of this configuration is that there needs to be access on both sides of the yoke for tool access to the bolt head 72 and the nut 68. As a result, this configuration is not well suited for larger, reward suspension control arm 26 mounts, such as the second bushing assembly 34 disclosed herein.

With additional reference to FIGS. 6-13, the second bushing assembly 34 includes a bushing bracket 94 that retains the second bushing 38. In the illustrated embodiment, the bushing bracket 94 includes a barrel portion 96 that is positioned longitudinally between first and second flange portions 98, 100. The barrel portion 96 of the bushing bracket 94 includes a bushing cavity 102 that receives the second bushing 38 such that the barrel portion 96 of the bushing bracket 94 circumscribes the second bushing 38. The central bore 58 of the second bushing 38 extends co-axially with the second bushing centerline 42. The first flange portion 98 of the bushing bracket 94 includes a first slot 104 and the second flange portion 100 includes a second slot 106. The first and second slots 104, 106 are elongated in an adjustment direction 108. The second bushing assembly 34 includes first and second fasteners 110, 112. The first and second fasteners 110, 112 extend through the first and second slots 104, 106 in the bushing bracket 94 to the second connection interface 30 of the vehicle frame member 24. Although other configurations are possible, in the illustrated embodiment, the first and second fasteners 110, 112 extend through mounting holes 114 in the second connection interface 30 of the vehicle frame member 24 and are backed by weld nuts 116. The weld nuts 116 are welded to the vehicle frame member 24 and are therefore fixed in place. In another non-limiting example, the mounting holes 114 in the vehicle frame member 24 may be threaded. In either configuration, tool access above the vehicle frame member 24 (i.e., access behind the second connection interface 30) is not required. The first and second fasteners 110, 112 include fastener heads 118 and fastener shanks 120. The fastener shank 120 of the first fastener 110 extends along a first fastener axis 122 and the fastener shank 120 of the second fastener 112 extends along a second fastener axis 124 that is parallel to and spaced from the first fastener axis 122. The adjustment direction 108 is perpendicular to the first fastener axis 122 and the second fastener axis 124. Although other configurations are possible, the bushing bracket 94 is made of a rigid material such as metal and the first and second fasteners 110, 112 may be metal bolts.

The first fastener 110 forms part of a cam adjustment mechanism 126 that couples the bushing bracket 94 to the second connection interface 30 of the vehicle frame member 24. The cam adjustment mechanism 126 includes a cam plate 128 that is rotatably retained on the first fastener 110, meaning that the cam plate 128 is rotatable relative to the bushing bracket 94 independent of rotation of the first fastener 110. The cam plate 128 rotates relative to the first fastener 110 about an axis of rotation 130 that is spaced from the bushing centerline at a nonparallel orientation. In other words, the axis of rotation 130 of the cam plate 128 is perpendicular or oblique to the bushing centerline.

The cam plate 128 includes a center point 132 and an off-center hole 134 that is spaced from the center point 132. The first fastener 110 extends through the off-center hole 134 in the cam plate 128 in a sliding fit such that the first fastener 110 defines the axis of rotation 130 of the cam plate 128 and the cam plate 128 operates as an eccentric lobe 136. In other words, the axis of rotation 130 of the cam plate 128 is co-extensive with the first fastener axis 122. The cam plate 128 has a flat disc-like shape and includes an outer circumferential surface 138. In the illustrated embodiment, the outer circumferential surface 138 of the cam plate 128 is circular; however, other profiles are possible such as oval or elliptical profiles. The outer circumferential surface 138 of the cam plate 128 is disposed in contact with one or more bearing surfaces 140 of the bushing bracket 94. Rotation of the cam plate 128 about the axis of rotation 130 causes the bushing bracket 94 and therefore the second bushing 38 to slide relative to the vehicle frame member 24 in the adjustment direction 108. Although other configurations are possible, in the illustrated example, the bearing surfaces 140 are defined by a channel 142 on the first flange of the bushing bracket 94. The channel 142 extends in a direction that is perpendicular to the adjustment direction 108 and receives the cam plate 128. The first slot 104 is positioned in the channel 142 and runs perpendicular to the channel 142.

The cam plate 128 includes a tool interface 144 that permits rotation of the cam plate 128 independent of rotation of the first fastener 110. The tool interface 144 can take many forms. In the illustrated example, the tool interface 144 is a square bore that extends through the eccentric lobe 136 of the cam plate 128. In accordance with this configuration, the center point 132 of the cam plate 128 is located between the off-center hole 134 and the square bore forming the tool interface 144. To adjust the position of the cam plate 128 and therefore the respective positions of the bushing bracket 94 and the second bushing 38, the first and second fasteners 110, 112 are loosened and then the cam plate 128 is rotated relative to the first fastener 110 about the axis of rotation 130 via the tool interface 144. Once the desired position and alignment are achieved, the first and second fasteners 110, 112 are re-tightened. Optionally, the cam plate 128 and the bushing bracket 94 can include indexing marks 146 that visually indicate a rotational position of the cam plate 128 relative to the bushing bracket 94. The indexing marks 146 can be configured such that they provide a visual indication of the number of degrees the cam plate 128 is rotated relative to normal (i.e., the orientation of the cam plate 128 relative to the bushing bracket 94 shown in FIG. 11).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle suspension assembly comprising:
a vehicle frame member having a connection interface;
a suspension control arm pivotally coupled to said connection interface of said vehicle frame member by a bushing assembly;
said bushing assembly including a bushing bracket and a bushing that is retained by said bushing bracket; and
a cam adjustment mechanism coupling said bushing bracket to said connection interface of said vehicle frame member, said cam adjustment mechanism including a cam plate rotatably retained on a first fastener where said cam plate is rotatable relative to said bushing bracket independent of rotation of said first fastener,
wherein rotation of said cam plate varies a position of said bushing bracket relative to said vehicle frame member, said cam plate including an off-center hole and said first fastener extending through said off-center hole in said cam plate in a sliding fit such that said first fastener defines an axis of rotation for said cam plate and said cam plate operates as an eccentric lobe, wherein said bushing bracket includes a first slot that is elongated in an adjustment direction and said first fastener extends through said first slot in said bushing bracket to said connection interface of said vehicle frame member.

2. The vehicle suspension assembly set forth in claim 1, wherein said cam plate includes an outer circumferential surface that is disposed in contact with at least one bearing surface of said bushing bracket such that rotation of said cam plate about said axis of rotation causes said bushing bracket and said bushing to slide relative to said vehicle frame member in said adjustment direction.

3. The vehicle suspension assembly set forth in claim 2, wherein said at least one bearing surface is defined by a channel in said bushing bracket that receives said cam plate.

4. The vehicle suspension assembly set forth in claim 1, wherein said bushing bracket includes a second slot that is elongated in said adjustment direction and wherein a second fastener extends through said second slot in said bushing bracket to said connection interface of said vehicle frame member.

5. The vehicle suspension assembly set forth in claim 1, wherein said bushing bracket has a bushing cavity that receives said bushing such that said bushing bracket circumscribes at least part of said bushing.

6. The vehicle suspension assembly set forth in claim 5, wherein said bushing has a central bore and said suspension control arm includes a post that is received in said central bore such that said bushing is positioned between said post of said suspension control arm and at least part of said bushing bracket.

7. The vehicle suspension assembly set forth in claim 1, wherein said cam plate includes a tool interface that permits rotation of said cam plate independent of rotation of said first fastener.

8. A vehicle suspension assembly comprising:
a vehicle frame member having a connection interface;
a suspension control arm pivotally coupled to said connection interface of said vehicle frame member by a bushing assembly;
said bushing assembly including a bushing bracket and a bushing that is retained by said bushing bracket; and
a cam adjustment mechanism coupling said bushing bracket to said connection interface of said vehicle frame member, said cam adjustment mechanism including a cam plate rotatably retained on a first fastener where said cam plate is rotatable relative to said bushing bracket independent of rotation of said first fastener,
wherein rotation of said cam plate varies a position of said bushing bracket relative to said vehicle frame member,
wherein said cam plate and said bushing bracket include indexing marks that visually indicate a rotational position of said cam plate relative to said bushing bracket.

9. A vehicle suspension assembly comprising:
a vehicle frame member having a connection interface;
a suspension control arm pivotally coupled to said connection interface of said vehicle frame member by a bushing assembly;
said bushing assembly including a bushing bracket and a bushing that is retained by said bushing bracket, said bushing having a bushing centerline that defines a pivot axis of said suspension control arm; and
a cam adjustment mechanism coupling said bushing bracket to said connection interface of said vehicle frame member, said cam adjustment mechanism including a cam plate rotatably retained on a first fastener, said cam plate being rotatable relative to said first fastener and said bushing bracket about an axis of rotation that is spaced from said bushing centerline, said axis of rotation extending in a nonparallel orientation relative to said bushing centerline.

10. The vehicle suspension assembly set forth in claim 9, wherein said cam plate includes an off-center hole and said first fastener extends through said off-center hole in said cam plate in a sliding fit such that said first fastener defines said axis of rotation of said cam plate and said cam plate operates as an eccentric lobe.

11. The vehicle suspension assembly set forth in claim 10, wherein said bushing bracket includes a first slot that is elongated in an adjustment direction and said first fastener extends through said first slot in said bushing bracket to said connection interface of said vehicle frame member.

12. The vehicle suspension assembly set forth in claim 11, wherein said cam plate includes an outer circumferential surface that is disposed in contact with at least one bearing surface of said bushing bracket such that rotation of said cam plate about said axis of rotation causes said bushing bracket and said bushing to slide relative to said vehicle frame member in said adjustment direction.

13. The vehicle suspension assembly set forth in claim 12, wherein said at least one bearing surface is defined by a channel in said bushing bracket that receives said cam plate.

14. The vehicle suspension assembly set forth in claim 11, wherein said bushing bracket includes a second slot that is elongated in said adjustment direction and that receives a second fastener that extends through said second slot to said connection interface of said vehicle frame member.

15. The vehicle suspension assembly set forth in claim 11, wherein said adjustment direction is perpendicular to said axis of rotation of said cam plate and said bushing centerline.

16. The vehicle suspension assembly set forth in claim 9, wherein said bushing has a central bore that extends co-axially with said bushing centerline and said suspension control arm includes a post that is received in said central bore such that said bushing is positioned annularly about said post of said suspension control arm.

17. The vehicle suspension assembly set forth in claim 9, wherein said axis of rotation of said cam plate is perpendicular to said bushing centerline.

18. The vehicle suspension assembly set forth in claim 9, wherein said axis of rotation of said cam plate is oblique to said bushing centerline.

\* \* \* \* \*